United States Patent [19]

Sexton

[11] Patent Number: 4,630,265

[45] Date of Patent: Dec. 16, 1986

[54] METHOD AND APPARATUS FOR SELECTING FOR USE BETWEEN DATA BUSES IN A REDUNDANT BUS COMMUNICATION SYSTEM

[75] Inventor: Daniel W. Sexton, Roanoke, Va.

[73] Assignee: General Electric Company, Salem, Va.

[21] Appl. No.: 654,588

[22] Filed: Sep. 26, 1984

[51] Int. Cl.$^4$ .............................................. H04J 3/02
[52] U.S. Cl. ................................ 370/85; 340/825.01
[58] Field of Search ........................... 370/85, 16, 88; 340/825.01

[56] References Cited

U.S. PATENT DOCUMENTS

| | | | |
|---|---|---|---|
| 4,076,961 | 2/1978 | Holsinger et al. | 340/825.01 |
| 4,159,470 | 6/1979 | Strojny et al. | 340/825.01 |
| 4,383,314 | 5/1983 | Tam | 370/88 |
| 4,560,985 | 12/1985 | Strecker et al. | 370/85 |

FOREIGN PATENT DOCUMENTS

| | | | |
|---|---|---|---|
| 1911083 | 10/1979 | Fed. Rep. of Germany | 370/16 |
| 0121521 | 9/1980 | Japan | 370/85 |
| 2062419 | 5/1981 | United Kingdom | 370/85 |

Primary Examiner—Douglas W. Olms
Assistant Examiner—Curtis Kuntz
Attorney, Agent, or Firm—Arnold E. Renner

[57] ABSTRACT

For use in a communications system in which a plurality of communication devices are connected to a plurality of buses in a redundant communication type system in which the same data is concurrently transmitted between the communication devices over the plurality of buses, a scheme determines which of the buses should be utilized for the reception of data through the examination of each of the buses for the existence of transmitted data. Upon determining that data is present on any of the buses, there is established a first period of time which terminates a fixed increment of time after data is absent from all of the buses. An indication is then provided for each bus which has data thereon during said first period of time and extending at least through a second fixed increment of time beyond that first period of time. The bus to be utilized is then selected from those which is found to have data during the first period of time on the basis of an algorithm which does not switch buses unless the bus previously connected to did not contain data.

25 Claims, 5 Drawing Figures

U.S. Patent   Dec. 16, 1986   Sheet 1 of 3   4,630,265
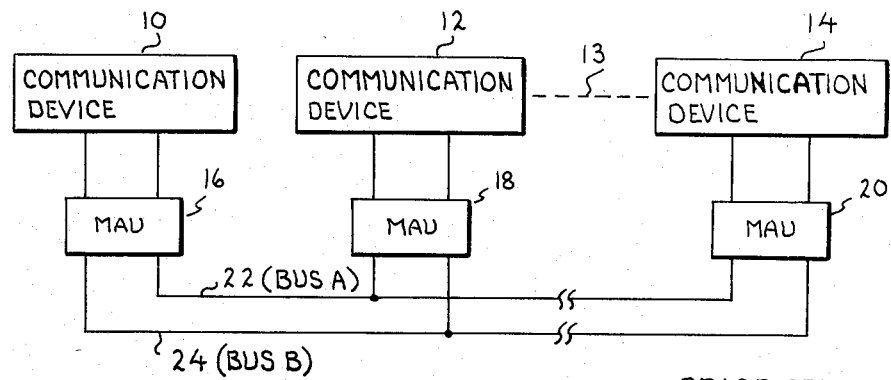
FIG.1   PRIOR ART
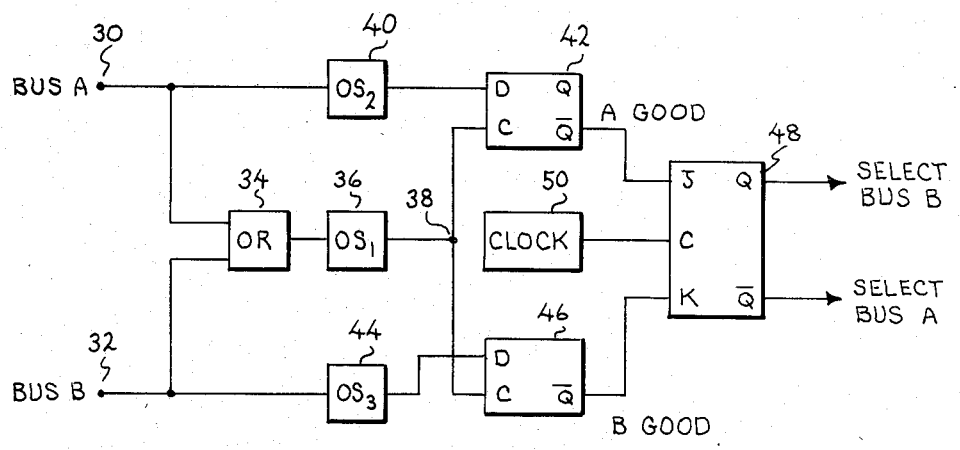
FIG.2
| J | K | Q |
|---|---|---|
| 0 | 0 | Q-1 (NO CHANGE) |
| 0 | 1 | 0 (SELECT A) |
| 1 | 0 | 1 (SELECT B) |
| 1 | 1 | $\overline{Q-1}$ (INVALID) |
FIG.4

METHOD AND APPARATUS FOR SELECTING FOR USE BETWEEN DATA BUSES IN A REDUNDANT BUS COMMUNICATION SYSTEM

BACKGROUND OF THE INVENTION

The present invention relates generally to communication systems and more particularly to a method and apparatus for determining which of a plurality of redundant buses, which concurrently carry the same data between multiple communication devices, is to be utilized by a communications device for the reception of data.

In the discipline of data communications, it is common to connect a plurality of various communication devices to a common bus which provide data links between those devices. It is also known to use plural buses (normally two, but sometimes more) in a redundant manner for reliability purposes. In these redundant systems, the same data is applied to each of the buses and a selection is made between the buses for the receipt of data. When a device transmits data, the device simultaneously puts the data on all of the buses for receipt by the other device(s).

In such a redundant system, a decision must be made as to which bus to use for the receipt of data since the data propagation time along the individual buses is not synchronized and hence an attempt to receive data for more than one bus could have disastrous results. It is a common practice in these systems of the prior art to have some higher authority, such as an overall system supervisor, to inspect the buses and to direct the various communications devices which are to receive the data as to which bus to employ. Several problems exist with respect to this type of system. A first of these problems is that the higher authority making this decision may already be heavily loaded in the number of functions it must perform and this bus selection requirement adds another function to this potentially overloaded authority. In addition, selection of the bus for use by a higher authority may result in the initial loss of fairly large amounts of data. This is because the authority may be involved in other functions at the time a bus develops a fault and thus the need for change is not immediately recognized and due to the fact that once a problem is recognized, the need for a change must be communicated to the other devices on the bus.

A third problem which can exist in the higher authority bus selection scheme being discussed is that if the problem or fault develops not on the bus per se, but on the leads from the bus to the communications device, the higher authority may not necessarily recognize that a problem exists. Failing to recognize that a problem exists, the higher authority will not, of course, direct a change to a different bus.

SUMMARY OF THE INVENTION

It is, therefore, an object of the present invention to provide, for use in a data communications system, an improved scheme for determining which of a plurality of buses, in a redundant bus system, is to be used for the reception of data.

It is another object to provide an improved method and apparatus for selecting, in a redundant bus communication system, a bus to be used to receive data based upon data presented to individual communication devices connected to the several buses.

It is a further object to provide a method and apparatus, which is local to each individual communication device connected to a redundant bus data communication system, for determining which bus will be utilized by that individual device for the receipt of data.

It is an additional object to provide a scheme for determining, in a data communication system, which of several redundant data buses will be utilized for the receipt of data by determining which of the buses contain data within a definable period and selecting the bus for use based upon an algorithm which provides for utilizing the bus last utilized so long as data appears thereon within the definable period.

The foregoing and other objects are achieved in accordance with the present invention by providing, for use in a data communication system having a plurality of communication devices connected to a redundant system of buses over which the same (identical) data is normally concurrently transmitted between the devices, a method and apparatus for determining which of the buses should be utilized for the reception of data by the individual devices. The scheme calls for examining each of the buses for the existence of transmitted data and establishing a period of time beginning at time the data first exists on any bus. Determination is then made as to which of the buses have data thereon during that period of time. The bus selected for use in receiving the data is selected from those determined to have data on the basis of an algorithm which states that the bus to be utilized will not be changed from that last used so long as data appeared on the last used bus for an appropriate period of time.

BRIEF DESCRIPTION OF THE DRAWINGS

While the invention is described in particularity in the claims annexed to and forming a part of this specification, a better understanding of the invention can be had with reference to the following description taken in conjunction with the accompanying drawing in which:

FIG. 1 is a schematic block diagram showing a typical data communication system, such as is known in the art, serving as one suitable environment for the present invention;

FIG. 2 is a block diagram illustrating a preferred apparatus for implementing the present invention and useful in understanding the method thereof;

FIG. 4 is a truth table illustrating an algorithm for the selection of a bus to be selected in accordance with the preferred embodiment of the present invention; and, FIG. 5 is a block diagram illustrating a second implementation of the present invention.

DETAILED DESCRIPTION

Reference is first made to FIG. 1 which shows a typical environment of the prior art and of the type in which the present invention can find application. As illustrated in FIG. 1, a plurality of communication devices are employed. Three such devices, 10, 12 and 14 are illustrated but, as indicated by the dashed line 13, any appropriate number could be included. The nature of the communication devices is not important in the present invention. Each of the devices, 10, 12 and 14 is shown connected by way, respectively, of a media access unit (MAU) 16, 18 or 20 to redundant data communication buses 22 (also designated "Bus A") and 24 (also designated "Bus B"). A function of each of the media access units is, essentially, to serve as an interface to convert the signals on the buses 22 and 24 to appropriate levels for use by the respective communication devices and vice versa. As will be understood as this description proceeds, the media access units may also include the circuitry of the present invention and perform the method thereof. Also, as will be understood, the functions of the units 16, 18 and 20 could be incorporated within the communication devices themselves but are shown separate in the present embodiment in accordance with the more typical arrangement.

As is understood in the art, buses 22 and 24 serve in a redundant fashion with the devices 10, 12 and 14 each selectively utilizing the buses to send and receive data to and from the other devices. The purpose of bus redundancy is, of course, to increase reliability as is well known in the art. That is, each of the buses is intended to independently and concurrently carry the same (identical) data such that in the event of failure in one bus the other bus is fully capable of providing communication. The typical system of the prior art employs some type of device (authority) connected on the buses to determine which of the buses will be utilized by all the communication devices. In the FIG. 1 depiction, one of the communication devices could fulfill this function and communicate this decision to the remaining devices. (In accordance with the present invention, as will be understood, it is not necessary that all the communication devices necessary access the same bus since the circuitry for the bus selection is individual to each of the devices.) It will also be understood that although two buses are illustrated as a typical system, more than two buses can be employed in those instances where extremely high reliability is desired or where the probability of bus failure is very high.

Figure 3:
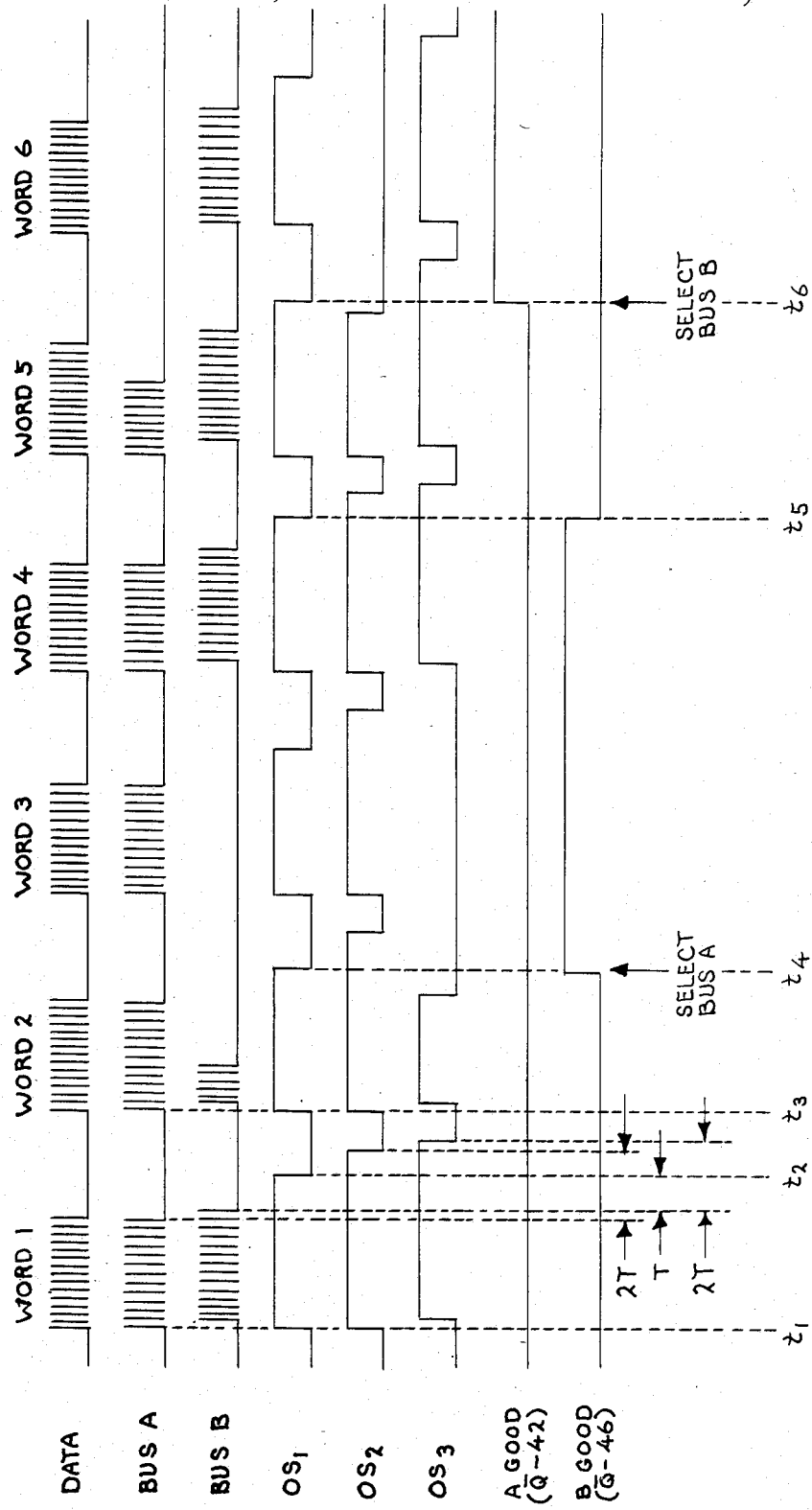
FIG. 3 constitutes waveforms, drawn to the same time base, helpful in the understanding of the present invention.

Reference is now made to FIG. 2 which shows a preferred embodiment of the apparatus for implementing the present invention and which will be useful in understanding of the method thereof, particularly when taken in conjunction with FIG. 3. In FIG. 2 data on Bus A is received at terminal 30 and is applied as one input to an OR gate 34. The other input to OR gate 34 is from terminal 32 which is connected to Bus B. Thus, when data appears on either Bus A or Bus B, OR gate 34 will be enabled and provide an output to a monostable multivibrator or one-shot 36 ($OS_1$). A monostable multivibrator, commonly called a one-shot, is a device which has only one stable state and which, upon receiving an appropriate input signal will go from that stable state into an unstable state for a predetermined length of time. In the present specification one-shots will be described as going from a binary zero (stable state) to a binary one (unstable state) upon the application of an input signal. (As used herein, a binary zero is a relatively low level signal while a binary one is a relatively high level signal.) When data appears on either Bus A or Bus B, OR gate 34 is enabled to provide an input signal to one shot 36 whose output signal at node 38 will go from a binary zero to a binary one and will remain at a binary one for a fixed period of time (herein designated "T") after the disappearance of data from both of the Buses A and B. The data signal on Bus A at terminal 30 is also applied to a second one shot 40 ($OS_2$) the output of which will be at a binary one for a fixed period time after the disappearance data signal from Bus A. As will be further explained, it is only necessary that this latter fixed period of time be longer than the period T associated with the one shot 36. The output of the one shot 40 is applied to the data (D) input terminal of a bistable multivibrator or flip flop 42. A second input to the C or clock terminal of flip flop 42 is the signal from one shot 36 at node 38.

In a manner similar to that above described, the data signal from Bus B at terminal 32 is applied to a one shot 44. The output of this one shot is applied to the data (D) terminal of a second flip flop 46, the second input to which at the clock (C) terminal is from node 38. In FIG. 2, because of the particular logic configuration used, the $\overline{Q}$ output is utilized from both of the flip flops 42 and 46. Thus, in accordance with that established and because the flip flops are designed to trigger or change state on the trailing edge of the clock input, i.e., the signal at node 38, the $\overline{Q}$ output of 42 will only change state from a binary zero to a binary one on the trailing edge of a pulse at its clock input when there is a binary zero signal present at its D input. In a similar manner, flip flop 46 will provide, at its $\overline{Q}$ output, a signal going from a binary zero to a binary one only at the disappearance of a signal at its clock input and a binary zero input at its D input terminal.

The $\overline{Q}$ outputs of flip flops 42 and 46 are applied, respectively, to the J and K inputs of a J-K flip flop 48 which has its clock terminal C connected to a free running clock 50 of a very high frequency. For example, the clock 50 may be running at a frequency of 8 megahertz. As is known in the art, J-K flip flop will change its output states only upon the occurrence of a clock pulse and in accordance with the state of the inputs to the J and K input terminals. The truth table for the J-K flip flop is shown in FIG. 4. As there indicated, if at the time of the clock pulse the J and K inputs are both a binary zero, the $\overline{Q}$ output will stay the same; i.e., it will not change from its previous state. If the J input is a binary zero and the K input is a binary one, then the Q output will be a binary zero and the $\overline{Q}$ will be a binary one, which in accordance with the illustrated embodiment of the present invention corresponds to the selection of Bus A. If the input to the J terminal is a binary one and that to the K terminal is a binary zero, then the Q output goes to a binary one meaning that Bus B will be selected. If both inputs are a binary one, which in accordance with the present invention means neither of the buses to which the system is connected is operative, then the system is indicated as being invalid.

The operation of the circuitry of FIG. 2 and the method of the present invention is best understood with respect to the waveforms shown in FIG. 3. In FIG. 3 it is assumed that the data is put on the buses in the form of a "burst" of data followed by periods of no data or "quiet time". The format in which the data is put on the bus is basically immaterial to the present invention and may be, for example, a dipulse modulated differential signal. Since the data format is immaterial to the invention, in FIG. 3 data will be represented simply as activity on the bus(es).

Looking now to FIG. 3 specifically, the upper trace labeled "Data" shows that one or more of the communication devices placed on the two Buses A and B six words of data, all of equal length interspaced by quiet times of the equal length. The second trace labeled "Bus A" shows that, as seen by a receiving communications device, words 1 through 4 were received in their entirety, word number 5 was incompletely received while none of word 6 was received. The third trace in FIG. 3 labeled "Bus B" shows that Bus B, as seen by a communications device, accurately transmitted word 1 but transmitted only a portion of word 2. Word 3 was completely missing. Words 4, 5 and 7 were transmitted in their entirety. It should also be noted that all traces in this figure are of the same time base and that the propagation time on Bus B is slightly behind Bus A. As such the devices would not receive the data on the buses at exactly the same time.

The next trace in FIG. 3, labeled $OS_1$, is the output of the one shot 36, the signal which will appear at node 38 in FIG. 2. It is seen that this one shot signal goes from a binary zero to a binary one as soon as data appears on either of the Buses A and B and will continue at that level for a fixed period after the disappearance of data from both buses. This period of time is shown as time period "T" in FIG. 3. The trace labeled "$OS_2$" in FIG. 3 is the output of the one shot 40. This signal rises from a binary zero to a binary one with the first appearance of data on Bus A and continues at that level so long as data is present on Bus A and for a defined period after the disappearance of that data. In FIG. 3 this defined period is labeled 2T. Time period 2T is selected somewhat arbitrarily as being twice as long as period T. The basic requirements for satisfactory system performance and to prevent race conditions are that period T be longer than the maximum differential time in transmission between data on Buses A and B and that the 2T period be longer than T by some discernible amount.

The next trace, labled $OS_3$, depicts the output of the one shot 44 of FIG. 2. It is seen that this signal rises from a binary zero to a binary one upon the first appearance of data on Bus B and continues at that level so long as data appears on Bus B plus a fixed period of time thereafter. This fixed period of time in FIG. 3 is also 2T.

The next trace in FIG. 3 is labeled "A GOOD" and represents the $\overline{Q}$ output of flip flop 42. As earlier described the A GOOD signal will remain a binary zero until such time as the output of one shot $OS_2$ is a binary zero at time one shot 36 ($OS_1$) goes to a binary zero from a binary one state. When the A GOOD signal (the $\overline{Q}$ output of one shot 42) goes to a binary one, a binary one signal is applied to the J terminal of the J-K flip flop 48 which, in accordance with the logic truth table of FIG. 4, will cause the selection of the Bus B if the K input terminal is at a binary zero.

The last trace in FIG. 3 is the B GOOD signal which is the $\overline{Q}$ output of flip flop 46. It is seen that this signal will go from a binary zero to a binary one when, at the trailing edge of the output signal from the $OS_1$ one shot there is a binary zero from the one shot $OS_3$. This occurs just after word 2 which was not properly received over Bus B.

Thus, in further explanation, it is seen that at time $t_1$ when the data word first appears on the buses, the $OS_1$ one shot will go to a binary one and will remain there until it times out at time $t_2$. (Time $t_2$ occurs at a fixed delay T after data disappears from both buses.) At time $t_2$ the one shot $OS_2$ and $OS_3$ are each of binary one by virtue of having received data on their respective buses and thus at time $t_2$ both the A GOOD and B GOOD signals will be a binary zero. In accordance with the previously described algorithm (FIG. 4), the J-K flip flop 48 will not change and thus the system will retain or reflect no change in bus selection. At the fixed delays 2T after the data has disappeared from the buses one shots $OS_2$ and $OS_3$ will time out and return to the stable binary zero state.

After a quiet time on the buses which was sufficient to allow both the $OS_2$ and $OS_3$ one shots to time out (i.e., a time greater than the second fixed period shown here as period 2T) data (word 2) is again presented to the buses and the $OS_1$ one shot again rises to a binary one. As illustrated, Bus B lost data before the complete word was received and thus at time $t_4$, when the $OS_1$ one shot timed out, one shot $OS_3$ had changed to a binary zero forcing the B GOOD signal to a binary one. As such, the J-K flip flop will, if necessary, change its state such that the $\overline{Q}$ output of flip flop 48 will become a binary one effecting, in accordance with the truth table of FIG. 4, the selection of Bus A. Thus, if the previous selection had been Bus A, there will be no change whereas if it previously had been on a Bus B selection, there will be a change. The B GOOD signal will remain a binary zero until such time ($t_5$) as when conditions exist that at a time out of the $OS_1$ one shot, the $OS_2$ one shot is at a binary zero signal.

Continuing with the FIG. 3 discussion, it is seen that word 5 was not completely received on Bus A but was properly received on Bus B. In this situation, therefore, when $OS_1$ times out (time $t_6$) the binary zero condition of $OS_2$ and the binary one condition of $OS_3$ will cause flip flops 42 and 46 to provide outputs which in turn cause the J-K flip flop 48 to effect a "select Bus B" output condition. Thus, it is seen that in accordance with this, there is a selection of buses so that not more than one data word can ever be lost so long as one of the buses is operative.

Figure 5:
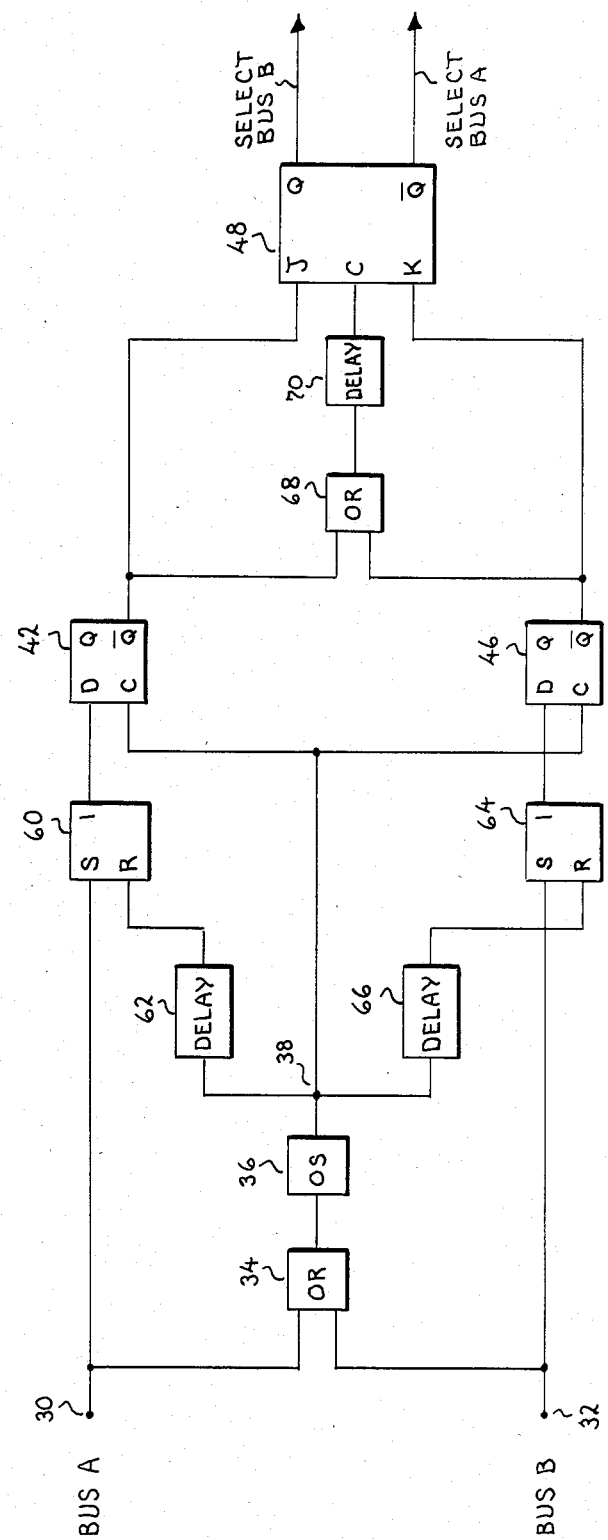

FIG. 5 shows a second possible implementation of the present invention which includes only one one shot and which essentially uses delays and flip flops in place of the one shots 40 and 44 of FIG. 2 and a delay and OR gate in place of the clock 50. In FIG. 5, those elements which are common to FIG. 2 are labeled with the same reference characters. In view of the previous discussion, the operation of the FIG. 5 circuit is probably self-evident. Very briefly, however, it is seen that the two terminals 30 and 32 are again respectively connected to the two buses and supply signals to OR gate 34, the output of which serves to effect the operation of one shot 36. In this particular case, the data from Bus A is also applied to the set (S) terminal of a simple flip flop 60, the reset (R) terminal of which receives the output signal of one shot 36 as delayed by a delay 62. The output of flip flop 60, which is applied to the D terminal of flip flop 42, will remain at a high level beginning with the time data first appears on Bus A and for a set period of time after the disappearance of the data from either terminal as determined by the delay 62. In similar manner, data on Bus B is applied to the set (S) terminal of a flip flop 64 the output of which is applied to the D terminal of flip flop 46. This latter signal will remain high until flip flop 64 is reset by the disappearance of the signal at node 38 as delayed by a second delay 66. Thus, in accordance with the description earlier given, the one shot 36 again provides for the first fixed period of time while the delays 62 and 64 provide for the second periods of delay. Insofar as J-K flip flop 48 is concerned, instead of the free running clock 50 of FIG. 2, clocking of this flip flop is achieved by applying the $\overline{Q}$ outputs of flip flops 42 and 46 to an OR gate 68 whose output is delayed by a delay 70 the output of which serves as the input to the clock (C) terminal of flip flop 48. This delay is simply to prevent race conditions.

Thus, it is seen and there has been shown and described a simple solution to the problem of bus selection which may be individually applied with respect to each of the communications devices of the system such that each communication device has associated capability to make its own decision as to which of a plurality of communication buses will be utilized.

While there have been shown and described what are at present considered to be the preferred embodiments of the present invention, modifications thereto will readily occur to those skilled in the art. For example, while the system has only been described specifically with respect to two redundant buses, it is obvious that by an expansion the logic circuitry and method more than two buses could be utilized. It is not desired, therefore, that the invention be limited to that specifically shown and described and it is intended to cover in the appended claims all such modifications as fall within the true spirit and scope of the invention.

What is claimed:

1. In a communications system including a plurality of communication devices connected to a plurality of common buses to which identical data is concurrently applied for transmission between the communications devices, a method of determining which of said buses should be utilized for data reception by an individual device comprising the steps:
    (a) examining each of said buses for the existence of transmitted data;
    (b) establishing a first period of time beginning at the time data exists on any of said buses;
    (c) determining each of said buses on which data existed during said first period of time; and,
    (d) selecting the bus to use for data reception from those determined to have had data during said first period of time based upon an algorithm including the step of remaining connected to the bus last connected to unless that bus did not show the existence of data during said first period of time.

2. The invention in accordance with claim 1 wherein said first period of time extends from the time of first appearance of data on any bus until a predetermined period of time after the disappearance of data from all buses.

3. The invention in accordance with claim 2 wherein said data is transmitted in words of predetermined length and wherein said predetermined period of time is greater than the maximum difference in propagation time of a word over said plurality of buses.

4. The invention in accordance with claim 2 wherein said number of buses is equal to two.

5. The invention in accordance with claim 1 wherein a number of buses is two, wherein said data is transmitted in words of predetermined length and wherein said predetermined period of time is greater than the maximum difference in propagation time of a word between the two buses.

6. In a communications system of the type in which a plurality of communication devices are each connected to a plurality of buses to which identical data, in the form of data words of prescribed length interspaced by periods of no transmission, is concurrently applied for transmission, a method of determining which of said buses should be utilized for the reception of data by a communications device comprising:
    (a) examining each of the buses for the existence of transmitted data;
    (b) establishing a first period of time beginning at the time data is first detected on any bus and ending a first increment of time after data disappears from all buses;
    (c) establishing a second period of time, for each of said buses, beginning at the time data first appears on that bus and ending a second increment of time after data disappears from that bus, said second increment of time being longer than said first increment;
    (d) determining, as a function of said first period of time and of said second periods of time, which of said buses have contained data during said first period of time; and,
    (e) selecting the bus to be utilized for the receipt of data from those determined to have had data as the function of an algorithm including the step of changing buses only if the bus last used to receive data did not exhibit data during said first period of time.

7. The invention in accordance with claim 6 wherein said first increment of time is greater than the maximum difference in propagation time of a data word over said plurality of buses.

8. The invention in accordance with claim 6 wherein said second increment of time is approximately twice the length of time as said first fixed increment of time.

9. The invention in accordance with claim 7 wherein said second increment of time is approximately twice the length of time as said first increment of time.

10. The invention in accordance with claim 6 wherein said second increment of time is shorter than the period of no transmission between successfully transmitted data words.

11. In a communications system including a plurality of communication devices connected to a plurality of common buses to which identical data is concurrently applied for transmission between the communications devices, means for selecting which of said buses is to be utilized for data reception by the individual devices comprising:
    (a) means for examining each of said buses for the existence of transmitted data;
    (b) means to establish a period of time beginning at the time data exists on any of said buses;
    (c) means to determine each of said buses which had data thereon during said period of time; and,
    (d) means to select the bus for use for data reception from those determined to have had data during said first period of time based upon an algorithm including the step of remaining connected to the bus last connected to unless that bus did not have data during said time period.

12. The invention in accordance with claim 11 wherein said means to establish said period of time includes a monostable multivibrator which changes from a first output state to a second output state in response to a signal indicative of the presence of data on any of said buses and returned to its first output state after a fixed increment of time after the occurrence of a signal indicative of the absence of data from all of said buses.

13. The invention in accordance with claim 12 wherein said data is transmitted in words of predetermined length and wherein said fixed increment of time is greater than the maximum difference in propagation time of a word over the several buses.

14. The invention in accordance with claim 12 wherein said number of buses is equal to two.

15. The invention in accordance with claim 11 wherein a number of buses is two, wherein said data is transmitted in words of predetermined length and wherein said predetermined period of time is greater than the maximum difference in propagation time of a word between the two buses.

16. In a communications system of the type in which a plurality of communication devices are each connected to a plurality of buses to which identical data, in the form of data words of prescribed length interspaced by periods of no transmission, is concurrently applied for transmission, means for determining which of said buses is to be utilized for the reception of data by a communications device comprising:
   (a) means responsive to data on said buses to effect a first signal for so long as data is present on any bus;
   (b) means responsive to said first signal to generate a second signal beginning at the time data is first detected on any bus and ending a first increment of time after the data disappears from all buses;
   (c) means associated with each of said buses and responsive to data thereon to establish respective timing signals beginning at the time data first appears on the that bus and ending a second increment of time after data disappears from that bus, said second increment of time being longer than said first increment;
   (d) means to determine, as a function of said first signal and of said timing signals, which of said buses have contained data during the existence of said first signal; and
   (e) means to select the bus to be used by a communications device for the receipt of data from those determined to have had data as a function of an algorithm incuding the steps of changing buses only if the bus last used to receive data did not contain data during the existence of said first signal.

17. The invention in accordance with claim 16 wherein said means to generate said first signal includes a monostable multivibrator.

18. The invention in accordance with claim 16 wherein said second increment of time is approximately twice the length of time as said first increment of time.

19. The invention in accordance with claim 16 wherein said second increment of time is shorter than the period of no transmission between successively transmitted data words.

20. In a communications system of the type in which a plurality of communication devices are each connected to a plurality of buses to which identical data, in the form of data words of prescribed length interspaced by periods of no transmission, is concurrently applied for transmission, means for determining which of said buses is to be utilized for the reception of data by a communications device comprising:
   (a) OR function logic means responsive to data on each of said buses to provide a first signal so long as data exists on any of said buses;
   (b) a first monostable multivibrator responsive to said first signal to generate a first timing signal during the existence of data on any bus and for a first fixed increment of time after the removal of data from all buses;
   (c) a plurality of second monostable multivibrator means individually associated with a respective one of said buses, each of said second monostable multivibrator means generating a respective second timing signal during the existence of data on its respective bus and for a second fixed increment of time after the removal of data from its respective bus, said second fixed increment of time being longer than said first increment of time;
   (d) a plurality of bistable multivibrator means individual ones of which are respectively associated with each of said second monostable vibrator means, each of said bistable multivibrator means being responsive to said first timing signal and to a second timing signal from an associated monostable multivibrator to produce an output signal indicative of the presence of data on a respective bus during defined periods; and,
   (e) means responsive to the output signals of said bistable multivibrator means to provide an output signal indicative of the bus to be utilized for the receipt of data.

21. The invention in accordance with claim 20 wherein the number of buses is two.

22. The invention in accordance with claim 20 wherein said means responsive to the output signals of said bistable multivibrator means to provide the output signal indicative of the bus to be used operates on an algorithm which requires remaining connected to the last bus utilized for the receipt of data so long as that bus has been indicated as having contained data.

23. In a communications system of the type in which a plurality of communication devices are each connected to a plurality of buses to which identical data, in the form of data words of prescribed length interspaced by periods of no transmission, is concurrently applied for transmission, means for determining which of said buses is to be utilized for the reception of data by a communications device comprising:
   (a) OR function logic means responsive to data on each of said buses to provide a first timing signal so long as data exists on any of said buses;
   (b) a first bistable multivibrator means associated with each bus responsive to data on its associated bus to provide an output signal of a first state and responsive to a delayed condition of said first timing signal to provide an output signal of a second state;
   (c) a second bistable multivibrator means associated with each first bistable multivibrator, each second bistable multivibrator means being responsive to said first timing signal and to an output signal of a first state from its associated first bistable multivibrator to produce an output signal indicative of the presence of data on a respective bus during defined periods; and
   (d) means responsive to the output signals of said second bistable multivibrator means to provide an output signal indicative of the bus to be utilized for the receipt of data.

24. The invention in accordance with claim 23 wherein the number of buses is two.

25. The invention in accordance with claim 23 wherein said means responsive to the output signals of said second bistable multivibrator means to provide the output signal indicative of the bus to be used operates on an algorithm which requires remaining connected to the last bus utilized for the receipt of data so long as that bus has been indicated as having contained data.

* * * * *